United States Patent
Gallegos-Lopez et al.

(10) Patent No.: US 8,228,016 B2
(45) Date of Patent: Jul. 24, 2012

(54) GAIN ADJUSTMENT TO IMPROVE TORQUE LINEARITY IN A FIELD WEAKENING REGION

(75) Inventors: Gabriel Gallegos-Lopez, Torrance, CA (US); Milun Perisic, Torrance, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 458 days.

(21) Appl. No.: 12/510,042

(22) Filed: Jul. 27, 2009

(65) Prior Publication Data

US 2009/0284195 A1    Nov. 19, 2009

Related U.S. Application Data

(63) Continuation-in-part of application No. 11/829,298, filed on Jul. 27, 2007, now Pat. No. 7,759,886.

(51) Int. Cl.
*G05B 11/36* (2006.01)
(52) U.S. Cl. .................. 318/609; 318/610
(58) Field of Classification Search .............. 318/609, 318/610, 400.02, 727, 798, 799, 812
See application file for complete search history.

(56) References Cited

U.S. PATENT DOCUMENTS

| | | | |
|---|---|---|---|
| 5,777,447 A * | 7/1998 | Okano | 318/434 |
| 5,883,484 A | 3/1999 | Akao | |
| 6,208,108 B1 | 3/2001 | Nashiki et al. | |
| 6,277,515 B1 * | 8/2001 | Akahira | 429/152 |
| 6,288,515 B1 * | 9/2001 | Hiti et al. | 318/722 |
| 6,329,781 B1 | 12/2001 | Matsui et al. | |
| 6,486,632 B2 * | 11/2002 | Okushima et al. | 318/599 |
| 6,605,912 B1 | 8/2003 | Bharadwaj et al. | |
| 6,657,413 B2 | 12/2003 | Nakatsugawa et al. | |
| 6,700,400 B2 * | 3/2004 | Atarashi | 318/400.01 |
| 7,015,667 B2 | 3/2006 | Patel et al. | |
| 7,023,168 B1 | 4/2006 | Patel et al. | |
| 7,053,581 B2 | 5/2006 | Chen et al. | |
| 7,174,989 B2 | 2/2007 | Mori et al. | |
| 7,759,886 B2 | 7/2010 | Gallegos-Lopez et al. | |

OTHER PUBLICATIONS

U.S. Office Action dated Sep. 22, 2010, issued in U.S. Appl. No. 12/786,104.
Notice of Allowance for U.S. Appl. No. 12/786,104 mailed Dec. 10, 2010.

* cited by examiner

*Primary Examiner* — Rina Duda
(74) *Attorney, Agent, or Firm* — Ingrassia Fisher & Lorenz P.C.

(57) ABSTRACT

Systems and methods are disclosed to improve torque linearity of an electric machine when operating in a field-weakening region. The systems and methods adjust the q-axis and the d-axis components of the stator current commands of the electric machine using a flux weakening control loop and a torque linearity control loop such that torque linearity is maintained when the machine operates in a field weakening region of operation.

18 Claims, 5 Drawing Sheets

Fig. 1 (EXISTING ART)

GAIN ADJUSTMENT TO IMPROVE TORQUE LINEARITY IN A FIELD WEAKENING REGION

CROSS-REFERENCE TO RELATED APPLICATION

This is a continuation-in-part of application Ser. No. 11/829,298, filed Jul. 27, 2007.

TECHNICAL FIELD

Embodiments of the present invention relate generally to electric machine control, and more particularly relate to techniques that improve torque linearity of an electric machine when operating in a field weakening region.

BACKGROUND

An electric machine converts electrical power into mechanical force and motion. Electric machines are found in numerous applications including household appliances such as fans, refrigerators, and washing machines. Electric drives are also increasingly used in electric and hybrid-electric vehicles.

A rotary electric machine generally has an internal rotating magnet, called the rotor, which revolves inside a stationary stator. The interaction between the rotor electromagnetic field with the field created by the stator winding creates the machine torque. The rotor may be a permanent magnet or it may be made of coils. However, if the rotor has permanent magnets embedded therein (i.e., the permanent magnets are not in the rotor surface), the electric machine may be referred to as an interior permanent magnet (IPM) machine. The part of the machine across which the input voltage is supplied is called the "armature." Depending upon the design of the machine, either the rotor or the stator can serve as the armature. In an IPM machine, the armature is the stator, and is a set of winding coils powered by input voltage to drive the electric machine.

The reverse task of converting mechanical energy into electrical energy is accomplished by a generator or dynamo. An electrical machine as mentioned above may also function as a generator since the components are the same. When the machine/generator is driven by mechanical torque, electricity is output. Traction machines used on hybrid and electric vehicles or locomotives often perform both tasks.

Typically as an electric machine accelerates, the armature (and hence field) current is further aligned opposite to the machine flux in order to reduce the total machine flux, and therefore, keep stator voltage within its limits. The reduction in field which reduces magnetic flux inside the machine is also called flux or field weakening. Field weakening control techniques can be used to increase performance in the torque-speed characteristic of the machine. To retain control of stator current, the machine field may be reduced by a field weakening control loop. The field or flux weakening in an IPM machine can be accomplished by adjusting the stator excitation. Stator excitation in an IPM machine may be controlled by voltage pulse width modulation (PWM) of a voltage source inverter.

Flux weakening techniques have been used in the past where IPM flux is purposely made weak to reduce the problems associated with high flux, such as over voltage due to high Back-EMF. For example, during a constant torque region of operation of an electric machine, closed loop current regulator control has been used to control the applied PWM voltage excitation so that the instantaneous phase currents follow their commanded values. However, saturation of the current regulators may occur at higher speeds when the machine terminal voltage approaches the maximum voltage of the PWM inverter. Beyond this point, the flux should be weakened to maintain proper current regulation up to the maximum available machine speed. Reducing the magnetic flux inside the machine provides improved power characteristics of the IPM machine at high speeds. However, torque may decrease in direct proportion to the flux.

Accordingly, it is desirable to keep torque linearity when a machine operates in the field-weakening region. Furthermore, other desirable features and characteristics will become apparent from the subsequent detailed description and the appended claims, taken in conjunction with the accompanying drawings and the foregoing technical field and background.

BRIEF SUMMARY

Control systems and methods are disclosed for producing torque linearity when operating in the field-weakening region of an electric machine. In one embodiment, a control system for an electric machine is provided. The control system includes a current regulator module, a field weakening module, and a torque linearity module. The current regulator module generates a first voltage command signal, and a second voltage command signal. Based on the first voltage command signal and the second voltage command signal, the field weakening module generates a first adjusting current command signal. The torque linearity module uses the first adjusting current command signal, along with a torque command signal and a first limited current command signal to generate a second adjusting current command signal.

In one non-limiting implementation, the torque linearity module comprises a derivative gain module and a limiter module coupled to the derivative gain module. The derivative gain module has a derivative gain that is computed based on the torque command signal and the first limited current command signal. The first adjusting current command signal is multiplied by the derivative gain to generate a raw second adjusting current command signal. The limiter module generates the second adjusting current command signal by limiting the raw second adjusting current command signal within limits set by the limiter module.

BRIEF DESCRIPTION OF THE DRAWINGS

Embodiments of the present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, controlled switches, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention. For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 2:
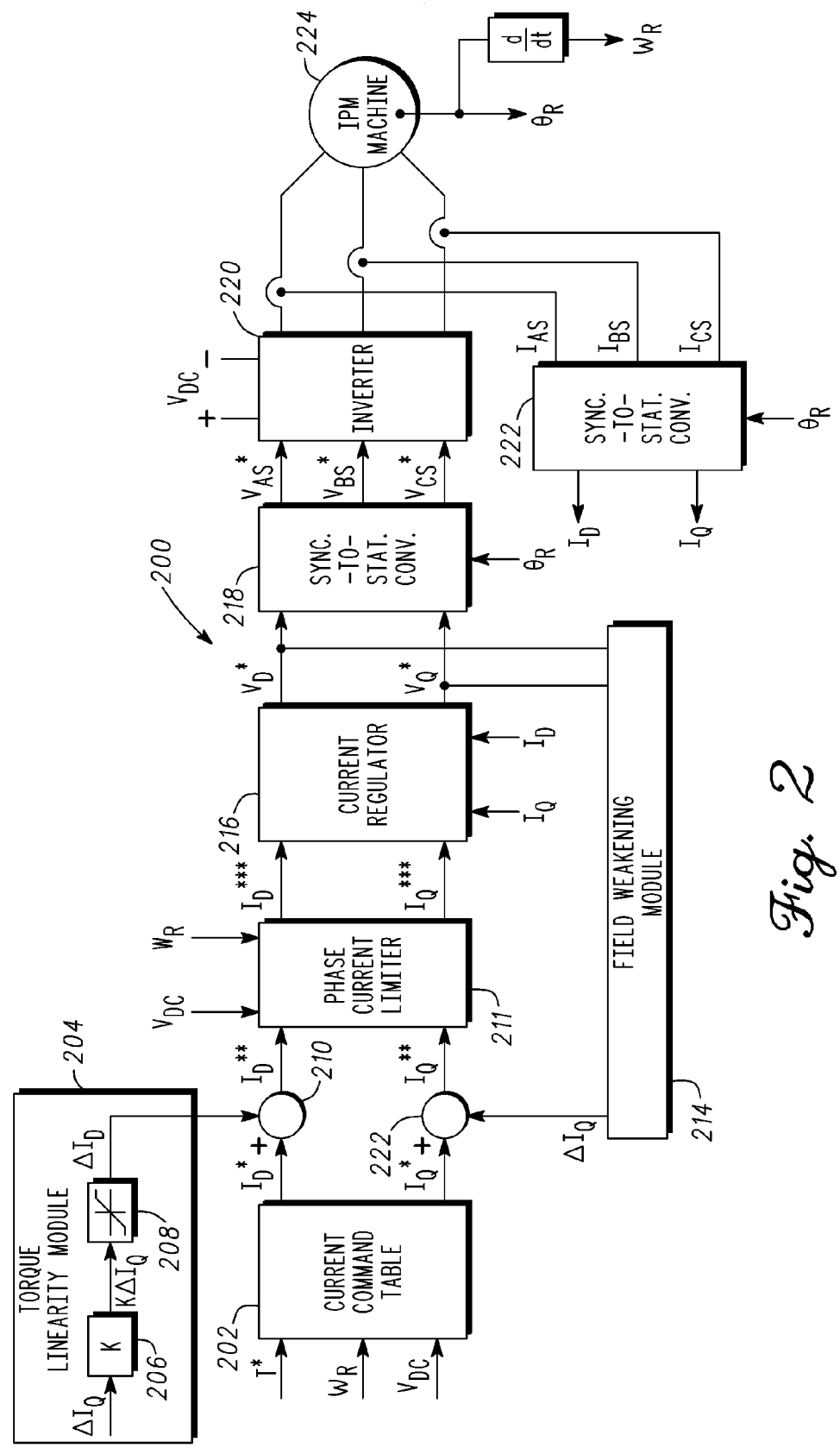
FIG. 2 is a functional block diagram of a control system.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts an example arrangement of elements, additional intervening elements, devices, features, or components may be present in an embodiment of the invention (assuming that the functionality of the system is not adversely affected).

Embodiments of the invention are described herein in the context of one practical non-limiting application, namely, a control system for an AC electric machine such as an IPM machine. In this context, the example technique is applicable to operation of a system suitable for a hybrid vehicle. Embodiments of the invention, however, are not limited to such vehicle applications, and the techniques described herein may also be utilized in other electric powered control applications.

Figure 1:
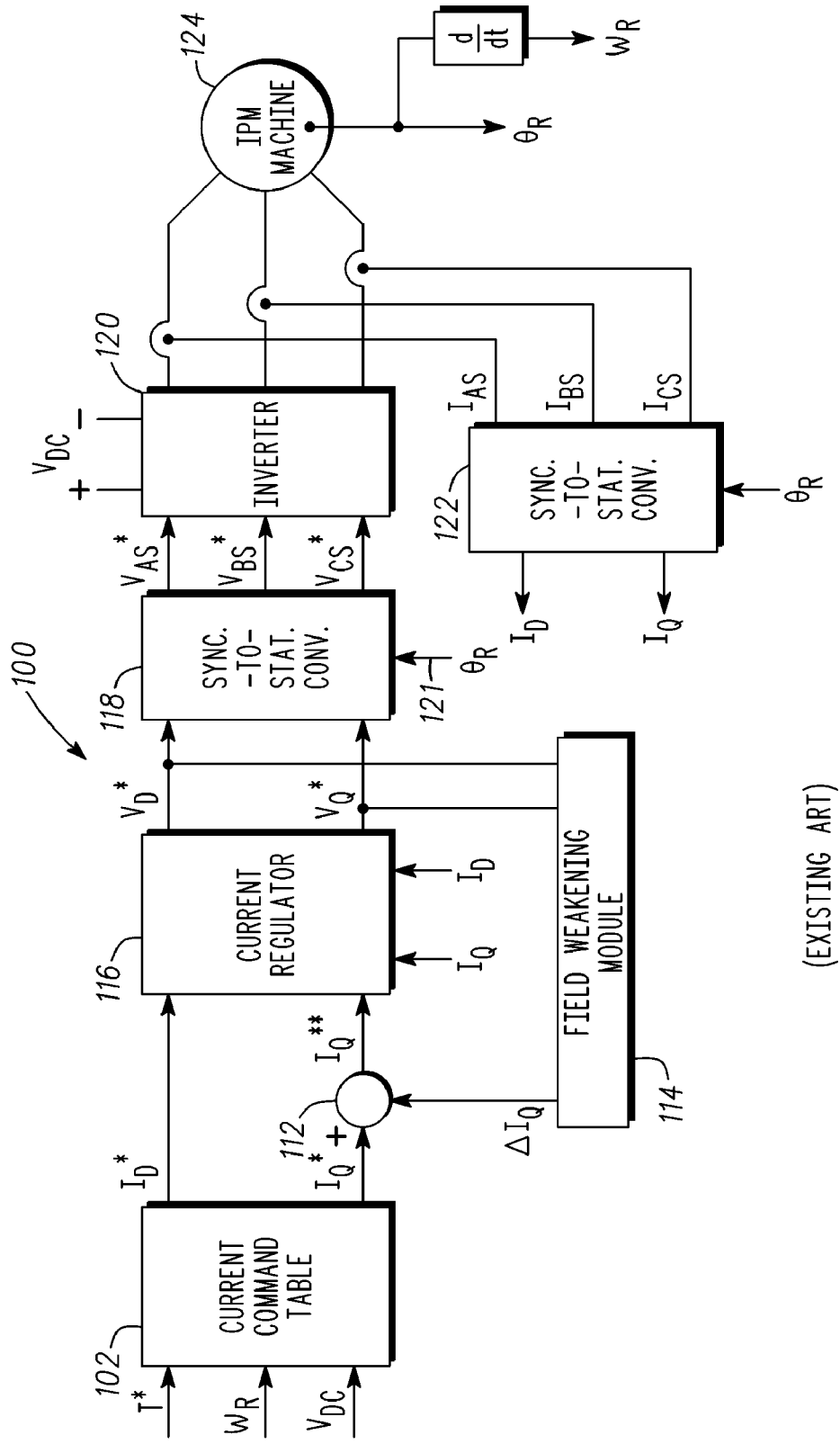
FIG. 1 is a functional block diagram of an existing control system for an electric machine.

FIG. 1 is a functional block diagram that depicts an existing control system 100 for a vector controlled IPM machine suitable for use with a hybrid vehicle. Such systems are well known and, therefore, the operation of system 100 will not be described in detail here. In summary, control system 100 adjusts the q-axis component of the stator current command $I_Q^*$ (q-axis current command) of the IPM machine using a flux weakening control loop. Control system 100 includes: a current command 3-D table lookup module 102, a synchronous current regulator module 116 (with dynamic over modulation), a synchronous-to-stationary conversion module 118, a PWM inverter 120, a stationary-to-synchronous conversion module 122, an IPM machine 124, and a field weakening module 114. Control system 100 operates as described below.

Based on a torque command T*, the rotor rotational speed $\omega_R^-$, and a DC-link voltage $V_{DC}$, optimal current commands ($I_D^*$ and $I_Q^*$) are generated using the current command 3-D table look-up module 102. The inputs to the table look-up module 102 are provided by a voltage sensor from the $V_{DC}$ input to the inverter 120, and a position sensor (not shown in FIG. 1) from the IPM machine 124. The q-axis current command $I_Q^*$ is adjusted to obtain an adjusted command ($I_Q^{**}$) as explained below.

The $I_D$ and $I_Q$ stationary feedback currents (d-axis and q-axis components of the stator current) from the IPM machine 124 are fed to the synchronous current regulator module 116, which generates synchronous voltage commands ($V_D^*$ and $V_Q^*$). The command voltages $V_D^*$ and $V_Q^*$ are vector rotated using the rotor angular position OR, which is provided by IPM machine 124. The outputs of the current regulator 116 (namely, $V_D^*$ and $V_Q^*$) are fed to the synchronous-to-stationary conversion module 118 to generate stationary frame voltage commands ($V_{AS}^*$, $V_{BS}^*$, and $V_{CS}^*$) based on $V_D^*$ and $V_Q^*$.

The $V_{AS}^*$, $V_{BS}^*$, and $V_{CS}^*$ stationary frame voltage commands are fed to the inverter 120 to generate $I_{AS}$, $I_{BS}$ and $I_{CS}$, which are the respective stationary frame currents. The inverter 120 may be, for example, a PWM inverter which applies alternating three phase voltage to the stator winding of the IPM machine 124.

The IPM machine 124 then operates at the rotational speed $\omega_R$ based on the stationary frame currents $I_{AS}$, $I_{BS}$ and $I_{CS}$.

The stationary-to-synchronous conversion module 122 generates $I_D$ and $I_Q$ (the d-axis and q-axis components of the stator feedback current) based on $I_{AS}$, $I_{BS}$, $I_{CS}$, and $\theta_R$. Additional details of the control system 100 can be found in United States Patent Application Number 2005/0212471, the content of which is hereby incorporated by reference in its entirety.

The Back-EMF is proportional to the rotational speed, $\omega_R$, which can be determined by computing a derivative of the rotor angular position $\theta_R$, which is provided by IPM machine 124. Moreover, the Back-EMF of the electric machine increases as the rotational speed $\omega_R$ of the electric machine is increased. Above a certain rotational speed, the voltage of the IPM machine may become higher than the voltage of the bus, resulting in reversal of current flow (regenerating instead of motoring). To control the $I_D$ and $I_Q$ components of the stator current, the machine flux is reduced by a field weakening control loop. The field weakening module 114 generates an adjusting current command $\Delta I_Q$ ($\Delta I_Q$ is the adjusting q-axis current, (which decreases the flux in the machine but also decreases the torque), based on $V_D^*$ and $V_Q^*$ to adjust the current command $I_Q^*$. $\Delta I_Q$ is then added to $I_Q^*$ by an adder 112 to generate the adjusted current command $I_Q^{**}$.

Figure 3:
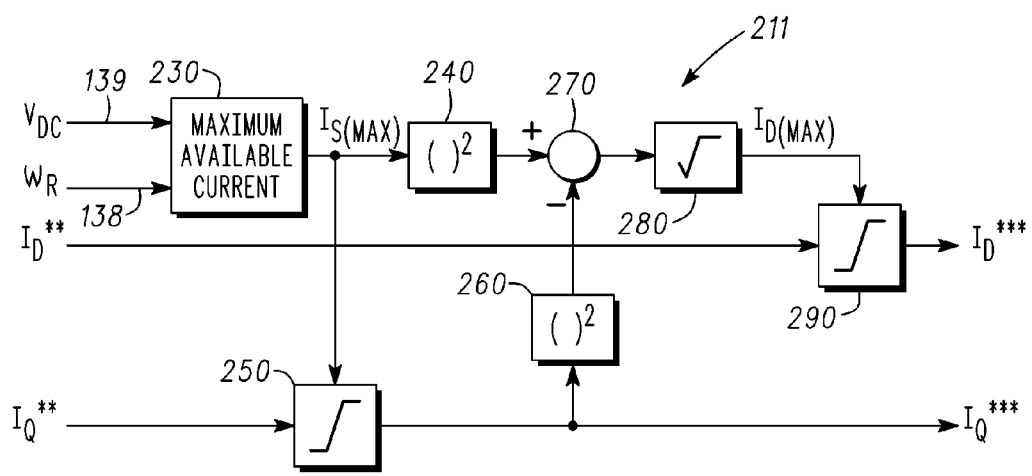
FIG. 3 is a functional block diagram of a phase current limiter module of the control system of FIG. 2.

Adjusting $I_Q^*$ in this manner results in a decrease in the torque, as will be explained in the context of FIG. 3. The aforementioned reduction in torque reduces the maximum torque available from the IPM machine, and it may reduce the machine efficiency. Additional details of the field weakening control loop module 114 can be found in U.S. patent application Ser. No. 11/552,580, filed Oct. 25, 2006, which is hereby incorporated by reference in its entirety.

To keep torque linearity in the field weakening region of an IPM machine, a torque linearity loop according to an embodiment of the invention is utilized as explained below.

FIG. 2 is a block diagram that illustrates a control system 200 for a vector controlled IPM machine, which is suitable for use in a hybrid vehicle. System 200 includes a torque linearity control loop that is suitably configured to perform a torque linearity control function according to an embodiment of the invention. System 200 is suitable for use with a vehicle having an electric traction machine (e.g., an electric vehicle or a hybrid vehicle). A practical control system 200 may include a number of electrical components, circuits and controller units other than those shown in FIG. 2. Conventional subsystems, features, and aspects of the control system 200 will not be described in detail herein. The control system 200 has components that are similar to control system 100 (common features, functions, and elements will not be redundantly described here). For this embodiment, as shown in FIG. 2, the control system 200 generally includes: a current command 3-D table lookup module 202, a torque linearity module 204, a phase current limiter module 211, a synchronous current regulator module 216, a synchronous-to-stationary conversion module 218, a PWM inverter 220, a stationary-to-synchronous conversion module 222, an IPM machine 224, and a field weakening control loop module 214. System 200 operates with an IPM machine 224. In particular, inverter 220 drives IPM machine 224.

The torque linearity module 204 generates an adjusting current command $\Delta I_D$ ($\Delta I_D$ is the adjusting current in the d-axis, which decreases the flux in the machine while torque linearity is maintained), which is based on $\Delta I_Q$ as explained below. In practice, $\Delta I_Q$ is provided by the field weakening control loop module 214. $\Delta I_D$ is added by an adder 210 to $I_D^*$ to generate an adjusted current command $I_D^{}$. The adjusted current command $I_D^{}$ is fed to the synchronous current regulator module 216 via the phase current limiter module 211, which ensures that both the adjusted current command $I_D^{}$ and $I_Q^{}$ are within certain limits.

For this embodiment, the torque linearity module 204 includes a proportional gain module 206 and a limiter module 208 coupled to the proportional gain module 206. The proportional gain module 206 applies a proportional gain, K, to $\Delta I_Q$. K may be a constant having a value that typically ranges from about one to about three, or it may be a variable that varies as a function of the torque command (T*) and the adjusted current command ($I_Q^{***}$). For example, K may be calculated based on the following relationship:

$$\frac{4}{3*P} \cdot \frac{T^*}{(L_Q - L_D)I_Q^{***2}},$$

where P is the number of poles of the machine, $L_D$ and $L_Q$ are the d-axis and q-axis machine inductances, T* is the torque command, and $I_Q^{***}$ is a limited q-axis current command.

$\Delta I_Q$ is multiplied by K to obtain an output current adjusting command ($\Delta I_D$). $\Delta I_D$ is then fed to the limiter 208 to keep the current adjusting command $\Delta I_D$ within its range (about −30 to about 0 AMPS).

To keep the $I_D$-$I_Q$ vector within the maximum torque per flux boundaries, the phase current limiter module 211 is used. The phase current limiter module 211 is configured to set the maximum phase current at any DC-voltage $V_{DC}$ and rotor angular velocity of the electric machine $\omega_R$. FIG. 3 is a functional block diagram that depicts the phase current limiter module 211 (see FIG. 2). The maximum available current block 230 provides the maximum phase current $I_{S(max)}$ as a function of $V_{DC}$ and $\omega_R$. The maximum phase current $I_{S(max)}$ is constant in the constant torque region. However, in the field weakening region, $I_{S(max)}$ is decreased accordingly to follow the maximum torque per flux machine curve. $I_Q^{}$ is first limited at block 250 by $I_{S(max)}$ resulting in the limited q-axis current command $I_Q^{*}$. The maximum d-axis current command is calculated via blocks 240, 260, 270, 280 as $I_{D(max)} = \sqrt{I_{S(max)}^2 - I_Q^{*2}}$. Then, $I_D^{}$ is limited by $I_{D(max)}$ at block 290 resulting in the limited d-axis current command $I_D^{***}$.

Figure 4:
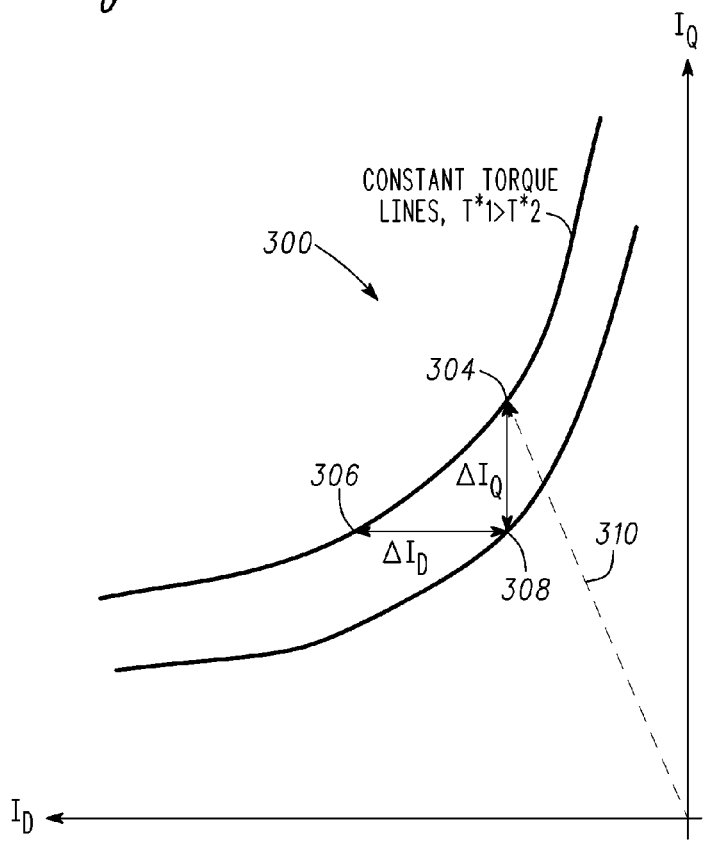
FIG. 4 is a graph that illustrates current regulation performance for an IPM machine with and without the torque linearity control block.

FIG. 4 is a graph that illustrates current regulation performance with and without the torque linearity control block. The field weakening control loop module 214 keeps the current regulator stable at the available voltage by adjusting the $I_Q$ current by an amount $\Delta I_Q$ as explained above. $\Delta I_Q$, however, moves the current vector 310 from point 304 on the T1 constant torque curve to point 308 on the T2 constant torque curve, thereby decreasing the torque in direct proportion to the flux. It is desirable to keep the current vector on the T1 constant torque curve in the field weakening region of the IPM machine. To this end, the control loop of the torque linearity module 204 generates $\Delta I_D$, which moves the current vector 310 from point 308 on the T2 constant torque curve to point 306 on the T1 constant torque curve, thereby keeping the torque constant and maintaining torque linearity in a field weakening region of the IPM machine. The techniques described herein adjust both $I_D$ and $I_Q$ to decrease flux in the field weakening region, while keeping torque linearity.

With this approach, the torque linearity is maintained in a field weakening region of the IPM machine.

Figure 5:
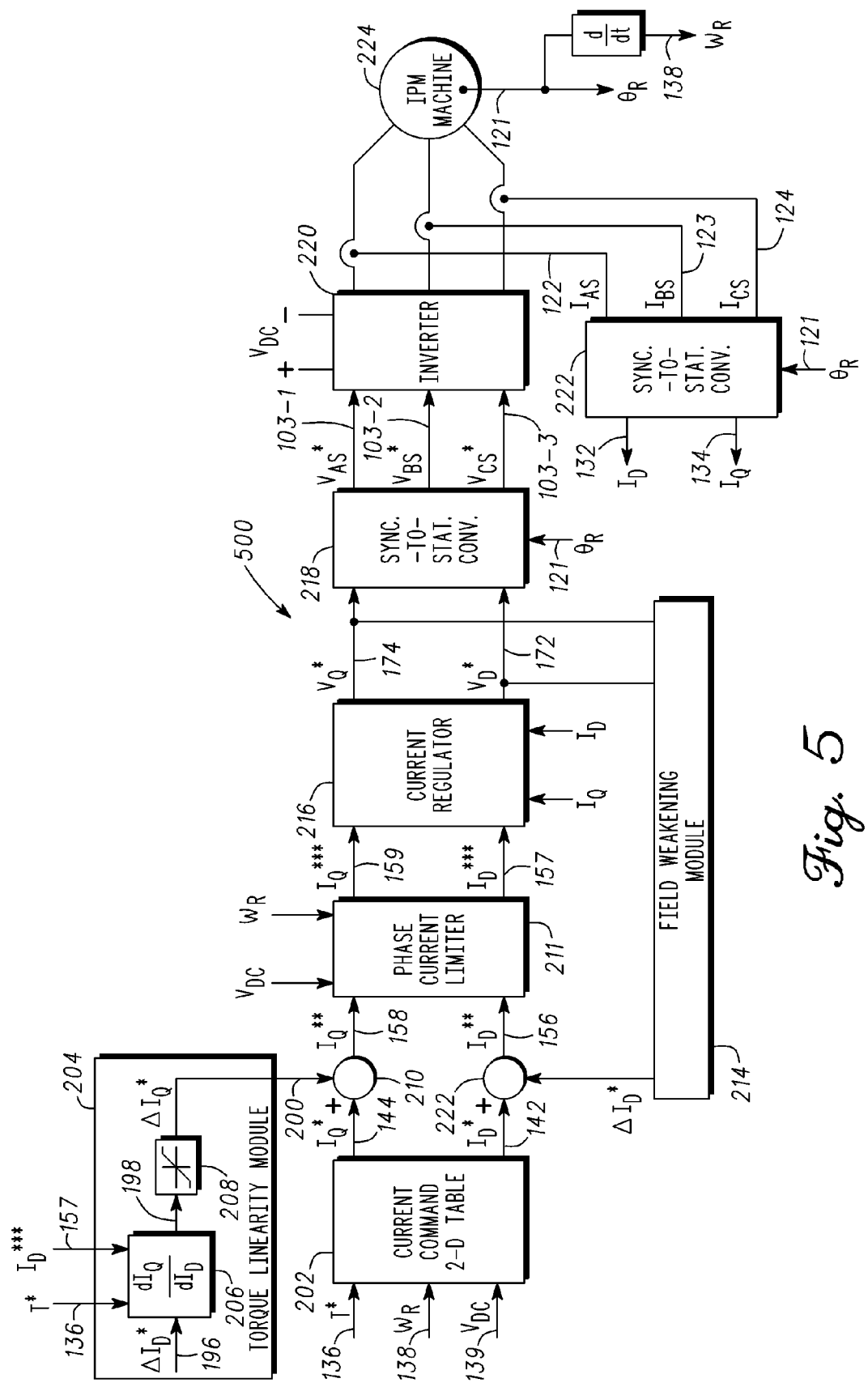
FIG. 5 is a block diagram that illustrates a torque control system for an AC electric machine.

FIG. 5 is a block diagram that illustrates a torque control system 500 for an AC electric machine in accordance with another embodiment. The system 500 is suitable for use in a hybrid vehicle. The torque control system 500 includes some of the same components or modules that are described above with reference to FIGS. 1 and 2, and for sake of brevity these will not be described here again. In addition, for sake of clarity, reference numbers are included to designate various signals of system 500.

In this exemplary implementation, the torque control system 500 includes a current command look-up table module 202 that receives a torque command signal (T*) 136, a rotor angular velocity 138, and a DC-link voltage 139 as inputs, and uses these inputs to generate the d-axis current command signal ($I_D^*$) 142 and the q-axis current command signal ($I_Q^*$) 144.

The system 500 also includes a torque linearity module 204 that is used to adjust the q-axis current command signal ($I_Q^*$) 144 and a field weakening module 214 that is used to adjust the d-axis current command signal ($I_D^*$) 142. As will be described below, the system 500 adjusts the original d-axis current command signal ($I_D^*$) 142 via the d-axis adjusting current command signal ($\Delta I_D^*$) 196 from a field weakening module 214, and a torque linearity module 204 also uses the d-axis adjusting current command signal ($\Delta I_D^*$) 196 and other inputs to determine a q-axis adjusting current command signal ($\Delta I_Q^*$) 200 that is used to adjust the q-axis current command signal ($I_Q^*$) 144.

Operation of the system 500 will now be described starting at the current regulator module 216. In one implementation, the current regulator module 216 can be a "synchronous current regulator module with dynamic over modulation."

The current regulator module 216 receives a stationary feedback d-axis current signal ($I_D$) 132, a stationary feedback q-axis current signal ($I_Q$) 134, a limited d-axis current command signal ($I_D^{*}$) 157, and a limited q-axis current command signal ($I_Q$*) 159, and uses these inputs to generate a d-axis voltage command signal ($V_D$*) 172, and a q-axis voltage command signal ($V_Q$*) 174. Although not illustrated, the current regulator module 216 computes a d-axis current error signal (not illustrated in FIG. 5) by subtracting the feedback d-axis current signal ($I_D$) 132 from the limited d-axis current command signal ($I_D$***) 157, and multiples the d-axis current error signal by a proportional-integral (PI) gain to compute the d-axis voltage command signal ($V_D$*) 172. Similarly, the current regulator module 216 computes a q-axis current error signal (not illustrated in FIG. 5) by subtracting the feedback q-axis current signal ($I_Q$) 134 from the limited q-axis current command signal ($I_Q$***) 159, and multiplies the q-axis current error signal by a proportional-integral (PI) gain to compute the q-axis voltage command signal ($V_Q$*) 174.

The current regulator module 216 is coupled to a synchronous-to-stationary conversion module 218, and supplies the d-axis voltage command signal ($V_D$*) 172 and the q-axis voltage command signal ($V_Q$*) 174 to the synchronous-to-stationary conversion module 218, and to the field weakening module 214.

Based on these signals, synchronous-to-stationary conversion module 218 generates a first sinusoidal voltage command (Vas), a second sinusoidal voltage command (Vbs), and a third sinusoidal voltage command (Vcs). The process of synchronous-to-stationary conversion is well-known in the art and for sake of brevity will not be described in detail.

The field weakening module 214 uses the d-axis voltage command signal ($V_D$*) 172, the q-axis voltage command signal ($V_Q$*) 174 and other inputs (not illustrated) to generate a d-axis adjusting current command signal ($\Delta I_D$*) 196 that is supplied to adder 222 and to the torque linearity module 204. In general, the d-axis voltage command signal ($V_D$*) 172 and q-axis voltage command signal ($V_Q$*) 174 can be used to compute a modulation index value that is subtracted from a modulation index reference signal, and the result can then be passed through a PI controller and a negative limiter module to generate the adjusting current command signal ($\Delta I_D$*) 196. The techniques for generating the d-axis adjusting current command signal ($\Delta I_D$*) 196 are known in the art and for sake of brevity will not be described in detail here.

The torque linearity module 204 uses the d-axis adjusting current command signal ($\Delta I_D$*) 196, a torque command signal (T*) 136 and the limited d-axis current command signal ($I_D$***) 157 to generate a q-axis adjusting current command signal ($\Delta I_Q$*) 200. As illustrated in FIG. 5, the torque linearity module 204 includes a derivate gain module 206 and a limiter module 208 coupled to the gain module 206.

The derivative gain ($dI_Q/dI_D$) of the derivative gain module 206 is computed based on and is a function of the torque command signal (T*) 136 and the limited d-axis current command signal ($I_D$***) 157. In one implementation, the derivative gain ($dI_Q/dI_D$) of the derivative gain module 206 is computed based on the equation (1):

$$\frac{dI_Q}{dI_D} = \frac{4}{3P} \times \frac{T^* \times (L_Q - L_D)}{[\lambda + I_D^{***} \times (L_D - L_Q)]^2} \qquad \text{Equation (1)}$$

In equation (1), P is the number of poles of the electric machine, T is the torque command signal (T*) 136, $I_D$* is the first limited current command signal ($I_D$*) 157, wherein $L_D$ and $L_Q$ are a d-axis inductance of the electric machine and a q-axis inductance of the electric machine, respectively, and $\lambda$ is a flux linkage constant.

The d-axis adjusting current command signal ($\Delta I_D$*) 196 is multiplied by the derivate gain to generate a raw q-axis adjusting current command signal 198 that is provided to the limiter module 208. The limiter module 208 generates the q-axis adjusting current command signal ($\Delta I_Q$*) 200 by limiting the raw q-axis adjusting current command signal 198 within limits set by the limiter module 208. For example, the q-axis adjusting current command signal ($\Delta I_Q$*) 200 is equal to the raw q-axis adjusting current command signal 198 when the raw q-axis adjusting current command signal 198 is within the limits set in limiter module 208.

Adder 222 uses the d-axis current command signal ($I_D$*) 142 and the d-axis adjusting current command signal ($\Delta I_D$*) 196 to generate an adjusted d-axis current command signal ($I_D$**) 156, and adder 210 uses the q-axis current command signal ($I_Q$*) 144 and the q-axis adjusting current command signal ($\Delta I_Q$*) 200 to generate an adjusted q-axis current command signal ($I_Q$**) 158.

The adjusted d-axis current command signal ($I_D$) 156, and the adjusted q-axis current command signal ($I_Q$) 158 are provided to a phase current limiter module 211. The phase current limiter module 211 also receives a DC-link voltage 139, and a rotor angular velocity of the electric machine 138, as described above with reference to FIGS. 2 and 3. The phase current limiter module 211 uses these inputs and limits the adjusted d-axis current command signal ($I_D$) 156 to produce a limited d-axis current command signal ($I_D$*) 157, and limits the adjusted q-axis current command signal ($I_Q$) 158 to produce a limited q-axis current command signal ($I_Q$*) 159. The limited d-axis current command signal ($I_D$*) 157 and the limited q-axis current command signal ($I_Q$*) 159 are provided to the current regulator module 216 as described above.

As will now be explained with reference to FIGS. 6 and 7, the system 500 adjusts the original d-axis current command signal ($I_D$*) 142 via the d-axis adjusting current command signal ($\Delta I_D$*) 196 from the field weakening module 214, and the torque linearity module 204 also uses the d-axis adjusting current command signal ($\Delta I_D$*) 196 and other inputs to determine a q-axis adjusting current command signal ($\Delta I_Q$*) 200 that is used to adjust the q-axis current command signal ($I_Q$*) 144.

Figure 6:
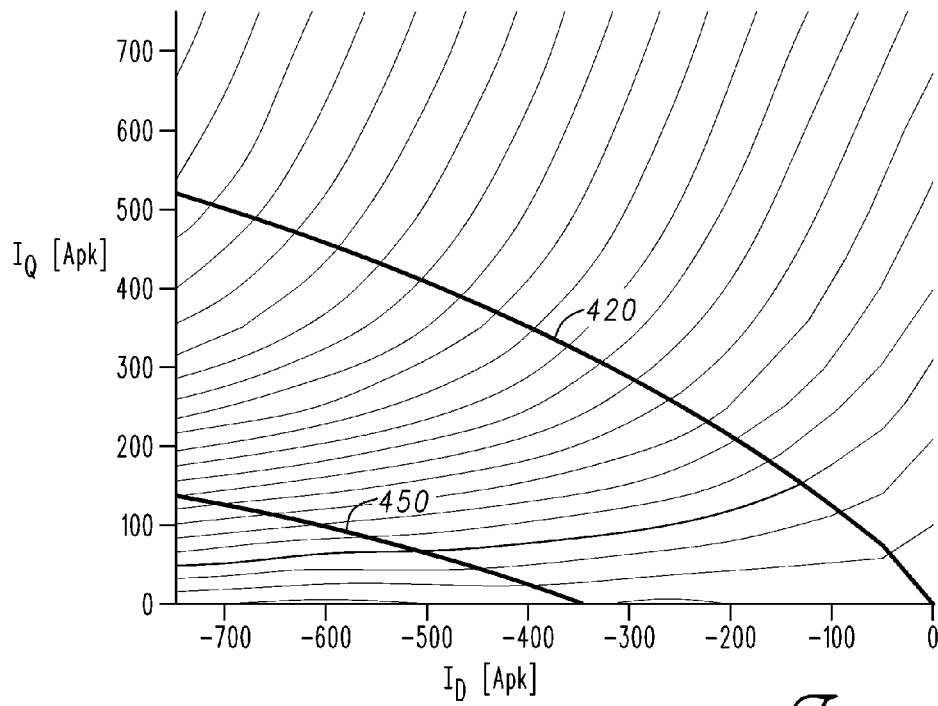
FIG. 6 is a graph that illustrates a Maximum Torque per Ampere (MTA) curve and a Maximum Torque per Volt (MTV) curve plotted against a series of constant torque curves.

FIG. 6 is a graph that illustrates a Maximum Torque per Ampere (MTA) curve 420 (upper curve) and a Maximum Torque per Volt (MTV) curve 450 (lower curve) plotted against a series of constant torque curves in the q-axis and d-axis plane. In FIG. 6, the area between MTA curve 420 and MTV curve 450 represents a first field-weakening region, and the points on the MTV curve 420 represent a second field-weakening region. Depending on how the machine 224 in FIG. 5 is driven, the machine 224 can operate anywhere along the MTA curve 420, or anywhere along the MTV curve 450, or anywhere between MTA curve 420 and the MTV curve 450. When the machine 224 operates between MTA curve 420 and MTV curve 450, the machine 224 is operating in the "first field-weakening region."

The machine 224 operates in a constant torque region (i.e., along the MTA curve 420) when the machine 224 is operating anywhere from zero (0 RPM) up to a base speed of the machine 224. The machine 224 operates in the first field-weakening region when the machine 224 is operating anywhere from the base speed of the machine 224 up to a medium speed of the machine 224. The machine 224 operates in the second field-weakening region when the machine 224 is operating anywhere from the medium speed up to a maximum speed of the machine 224. It should be noted that the base speed, medium speed and maximum speed are highly dependent on machine parameters.

Thus, the system 500 is used or kicks in when the machine is operating in the first field-weakening region (i.e., between MTA curve 420 and MTV curve 450 and when the machine 224 is operating anywhere from the base speed of the machine 224 up to a medium speed of the machine 224).

Each of the upward opening curves is a plot of the feedback q-axis current signal ($I_Q$) 134 as a function of feedback d-axis current signal ($I_D$) 132 for constant torque value of the torque command signal (T*) 136, and hence are called "constant torque curves." Each constant torque curve represents a different constant torque value. In other words, along any particular constant torque curve the machine provides the same torque value. These constant torque values are increased from bottom most constant torque curve towards the topmost constant torque curve. Each constant torque curve shows how the feedback q-axis current signal ($I_Q$) 134 changes as a function of feedback d-axis current signal ($I_D$) 132 for a particular torque value that is being applied.

The intersection between the MTV curve 450 (lower curve) and each of the constant torque curves represents the maximum torque per volt. The intersection between the MTA curve 420 (upper curve) and each of the constant torque curves represents the minimum phase current magnitude necessary to produce a particular torque value. Along any particular constant torque curve, the same torque value will be produced but it is desirable to produce that torque value with the minimum phase current magnitude.

When the machine 224 operates in a field weakening region, the torque command signal (T*) 136 and the limited d-axis current command signal ($I_D$***) 157 are used to determine the slope of constant torque lines as described above with reference to torque linearity module 204.

Figure 7:
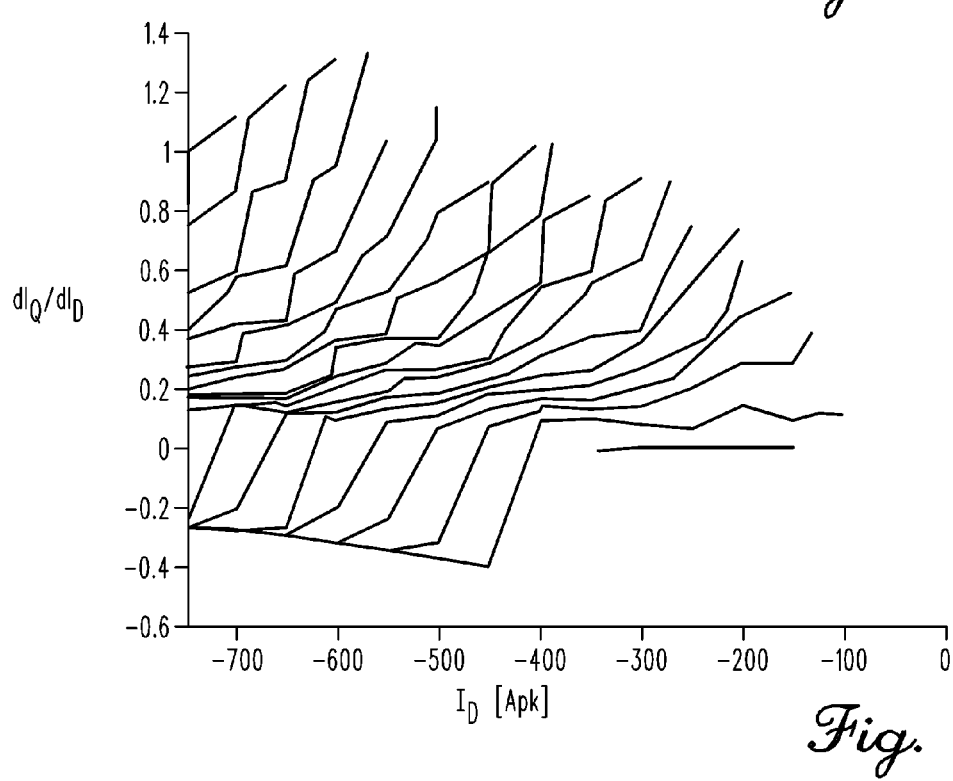
FIG. 7 is a graph that shows a set of curves that plot a derivative gain of derivative gain module as function of feedback d-axis current signal ($I_D$) for a particular torque value.

FIG. 7 is a graph that shows a set of curves that plot the derivative gain ($dI_Q/dI_D$) of the derivative gain module 206 as function of feedback d-axis current signal ($I_D$) 132 for a particular torque value. Each curve represents a different particular torque value. In one implementation, this set of curves can be calculated in real-time using equation (1) shown above. In another implementation, this set of curves can be calculated in advance and stored in a look-up table implemented at the derivative gain module 206. This look-up table can include indexes for torque command signal (T*) 136 and the limited d-axis current command signal ($I_D$***) 157. The derivative gain ($dI_Q/dI_D$) represents the slope of constant torque lines. Once the derivative gain ($dI_Q/dI_D$) is calculated, it is multiplied by the d-axis adjusting current command signal ($\Delta I_D$*) 196 to obtain the raw q-axis adjusting current command signal 198 that is passed to limiter module 208. The torque linearity module 204 adjusts the q-axis current command signal ($I_Q$*) 144 based on the slope of constant torque lines via the q-axis adjusting current command signal ($\Delta I_Q$*) 200. Together these approaches can improve torque linearity in the field-weakening region despite changes in machine parameters Referring again to FIG. 5, it is noted that the torque control system 500 architecture is described as it might be applied in a motor drive system of a hybrid/electric vehicle (HEV) according to one exemplary implementation of the present invention, in which the system 500 is described as being used to control a three-phase IPM 224 via a three-phase inverter module 220 by adjusting current commands that control the three-phase IPM 224.

Although the IPM 224 is illustrated as being an interior permanent magnet synchronous AC motor, it should be appreciated that the illustrated embodiment is only one non-limiting example of the types of AC machines that the disclosed embodiments can be applied to and that in this regard the disclosed embodiments can be applied to any type of AC machine. Here the term "AC machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPM) machines and interior permanent magnet (IPM) machines. Asynchronous AC machines include induction machines. Although an AC machine can be an AC motor (i.e., apparatus used to convert AC electrical energy power at its input to produce to mechanical energy or power), an AC machine is not limited to being an AC motor, but can also encompass AC generators that are used to convert mechanical energy or power at its prime mover into electrical AC energy or power at its output. Any of the machines can be an AC motor or an AC generator. An AC motor is an electric motor that is driven by an alternating current (AC). An AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous. A synchronous AC motor rotates exactly at the supply frequency or a sub-multiple of the supply frequency. The magnetic field on the rotor is either generated by current delivered through slip rings or by a permanent magnet. In implementations where the AC machine is a permanent magnet synchronous AC motor this should be understood to encompass IPM motors. By contrast, an asynchronous (or induction) AC motor turns slightly slower than the supply frequency. The magnetic field on the rotor of this motor is created by an induced current.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control system for an electric machine, the control system comprising:
   a current regulator module designed to generate a first voltage command signal, and a second voltage command signal;
   a field weakening module designed to generate a first adjusting current command signal based on the first voltage command signal and the second voltage command signal; and
   a torque linearity module designed to generate a second adjusting current command signal based on the first adjusting current command signal, a torque command signal and a first limited current command signal, wherein the torque linearity module further comprises:
   a derivative gain module having a derivative gain that is computed based on the torque command signal and the first limited current command signal, wherein the first adjusting current command signal is multiplied by the derivative gain to generate a raw second adjusting current command signal; and a limiter module, coupled to the gain module, and designed to generate the second adjusting current command signal by limiting the raw second adjusting current command signal within limits set by the limiter module.

2. The system according to claim 1, wherein the derivative gain of the derivative gain module is a function of the torque command signal and a first adjusted current command signal.

3. The system according to claim 2, wherein the derivative gain of the derivative gain module is computed based on the equation:

$$\frac{dI_Q}{dI_D} = \frac{4}{3P} \times \frac{T^* \times (L_Q - L_D)}{[\lambda + I_D^{***} \times (L_D - L_Q)]^2},$$

wherein P is the number of poles of the electric machine, $T^*$ is the torque command signal, wherein $I_D^{***}$ is the first limited current command signal, wherein $L_D$ and $L_Q$ are a first inductance and a second inductance of the electric machine, respectively, and wherein $\lambda$ is a flux linkage constant.

4. The system according to claim 1, further comprising:
a current command look-up table module that receives the torque command signal, a rotor angular velocity, and a DC-link voltage, and that generates a first current command signal and a second current command signal.

5. The system according to claim 4, further comprising:
a first adder designed to generate a first adjusted current command signal based on the first current command signal and the first adjusting current command signal; and
a second adder designed to generate a second adjusted current command signal based on a second current command signal and the second adjusting current command signal.

6. The system according to claim 5, further comprising:
a phase current limiter module that receives a DC-link voltage, and a rotor angular velocity of the electric machine, and that limits the first adjusted current command signal to generate the first limited current command signal that is provided to the current regulator module, and limits the second adjusted current command signal to generate a second limited current command signal that is provided to the current regulator module.

7. A control system for an alternating current (AC) electric machine, the control system comprising:
a current regulator module designed to generate a d-axis voltage command signal, and a q-axis voltage command signal based on a feedback d-axis current signal, a feedback q-axis current signal, a limited d-axis current command signal, and a limited q-axis current command signal;
a field weakening module designed to generate a d-axis adjusting current command signal based on the d-axis voltage command signal and the q-axis voltage command signal;
a first adder designed to generate an adjusted d-axis current command signal based on a d-axis current command signal and the d-axis adjusting current command signal;
a torque linearity module designed to generate a q-axis adjusting current command signal based on the d-axis adjusting current command signal, a torque command signal and the adjusted d-axis current command signal; and
a second adder designed to generate an adjusted q-axis current command signal based on a q-axis current command signal and the q-axis adjusting current command signal.

8. The system according to claim 7, wherein the torque linearity module further comprises:
a derivative gain module having a derivative gain that is computed based on the torque command signal and the limited d-axis current command signal, wherein the d-axis adjusting current command signal is multiplied by the derivative gain to generate a raw q-axis adjusting current command signal; and
a limiter module, coupled to the gain module, and designed to generate the q-axis adjusting current command signal by limiting the raw q-axis adjusting current command signal within limits set by the limiter module.

9. The system according to claim 8, wherein the derivative gain of the derivative gain module is a function of the torque command signal and the adjusted d-axis current command signal.

10. The system according to claim 9, wherein the derivative gain of the derivative gain module is computed based on the equation:

$$\frac{dI_Q}{dI_D} = \frac{4}{3P} \times \frac{T^* \times (L_Q - L_D)}{[\lambda + I_D^{***} \times (L_D - L_Q)]^2},$$

wherein P is the number of poles of the electric machine, $T^*$ is the torque command signal, wherein $I_D^{***}$ is the first limited current command signal, wherein $L_D$ and $L_Q$ are a first inductance and a second inductance of the electric machine, respectively, and wherein $\lambda$ is a flux linkage constant.

11. The system according to claim 7, further comprising:
a current command look-up table module that receives the torque command signal, a rotor angular velocity, and a DC-link voltage, and that generates the d-axis current command signal and the q-axis current command signal.

12. The system according to claim 7, further comprising:
a phase current limiter module that receives a DC-link voltage, and a rotor angular velocity of the electric machine, and that limits the adjusted d-axis current command signal to generate the limited d-axis current command signal, and limits the adjusted q-axis current command signal to generate the limited q-axis current command signal.

13. A method for controlling an electric machine, the method comprising:
generating a first voltage command signal, and a second voltage command signal based on a first feedback current signal, a second feedback current signal, a first limited current command signal, and a second limited current command signal;
generating a first adjusting current command signal based on the first voltage command signal and the second voltage command signal; and
generating a second adjusting current command signal based on the first adjusting current command signal, a torque command signal and a first adjusted current command signal.

14. The method according to claim 13, wherein the step of generating a second adjusting current command signal, comprises:
  computing a derivative gain based on the torque command signal and the first limited current command signal;
  determining a product of the first adjusting current command signal and the derivative gain to generate a raw second adjusting current command signal; and
  limiting the raw second adjusting current command signal to generate the second adjusting current command signal.

15. The method according to claim 14, wherein the derivative gain of the derivative gain module is computed based on the equation:

$$\frac{dI_Q}{dI_D} = \frac{4}{3P} \times \frac{T^* \times (L_Q - L_D)}{[\lambda + I_D^{**} \times (L_D - L_Q)]^2},$$

wherein P is the number of poles of the electric machine, T* is the torque command signal, wherein $I_D^{***}$ is the first limited current command signal, wherein $L_D$ and $L_Q$ are a first inductance and a second inductance of the electric machine, respectively, and wherein λ is a flux linkage constant.

16. The method according to claim 13, further comprising:
  receiving the torque command signal, a rotor angular velocity, and a DC-link voltage; and
  generating, based on the torque command signal, the rotor angular velocity, and the DC-link voltage, a first current command signal and a second current command signal.

17. The method according to claim 16, further comprising:
  adding the first current command signal to the first adjusting current command signal to generate the first adjusted current command signal; and
  adding the second current command signal to the second adjusting current command signal to generate a second adjusted current command signal.

18. The method according to claim 17, further comprising:
  receiving the DC-link voltage, and the rotor angular velocity of the electric machine;
  limiting the first adjusted current command signal based on the DC-link voltage, and the rotor angular velocity to generate the first limited current command signal; and
  limiting the second adjusted current command signal based on the DC-link voltage, and the rotor angular velocity to generate the second limited current command signal.

* * * * *